US012595773B2

(12) United States Patent
Lochschmied et al.

(10) Patent No.: US 12,595,773 B2
(45) Date of Patent: Apr. 7, 2026

(54) COMBUSTION APPARATUS WITH MASS FLOW SENSOR

(71) Applicant: Siemens Aktiengesellschaft, Munich (DE)

(72) Inventors: Rainer Lochschmied, Rheinstetten-Forchheim (DE); Mike Schmanau, Malsch (DE); Bernd Schmiederer, Karlsruhe (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 369 days.

(21) Appl. No.: 18/348,470

(22) Filed: Jul. 7, 2023

(65) Prior Publication Data

US 2024/0018921 A1 Jan. 18, 2024

(30) Foreign Application Priority Data

Jul. 12, 2022 (EP) .................................... 22184530

(51) Int. Cl.
*F23N 3/00* (2006.01)
*F02D 41/14* (2006.01)

(52) U.S. Cl.
CPC ........... *F02D 41/144* (2013.01); *F23N 3/002* (2013.01); *F23D 2208/10* (2013.01)

(58) Field of Classification Search
CPC ..... F02D 41/144; F23N 3/002; F23D 2208/10
USPC ........................................................... 431/42
See application file for complete search history.

(56) References Cited

U.S. PATENT DOCUMENTS

| | | | | |
|---|---|---|---|---|
| 2009/0000389 | A1* | 1/2009 | Redon | G01F 1/6842 73/861 |
| 2016/0076767 | A1* | 3/2016 | Super | F23N 1/022 431/18 |
| 2018/0094807 | A1 | 4/2018 | Lochschmied | F23N 1/02 |
| 2018/0094808 | A1 | 4/2018 | Lochschmied | F23N 1/02 |
| 2018/0094809 | A1 | 4/2018 | Lochschmied | F23N 1/025 |

FOREIGN PATENT DOCUMENTS

| | | | |
|---|---|---|---|
| DE | 20 2019 100 263 | 2/2019 | F23N 1/02 |
| DE | 10 2017 128 953 | 6/2019 | G01F 1/684 |
| EP | 2 105 714 | 9/2009 | G01F 1/68 |
| EP | 3 301 364 | 8/2019 | F26N 5/18 |
| EP | 3 301 362 | 3/2020 | F23N 1/02 |
| EP | 3 301 363 | 8/2020 | F23N 1/02 |
| WO | 2013 030198 | 3/2013 | G01F 1/684 |

* cited by examiner

*Primary Examiner* — Avinash A Savani
(74) *Attorney, Agent, or Firm* — Slayden Grubert Beard PLLC

(57) ABSTRACT

Various embodiments include a combustion apparatus. An example apparatus includes: a burner; a side duct; and a feed duct. The side duct comprises an inlet, an outlet, and a mass flow sensor between the inlet and the outlet of the side duct. The mass flow sensor is configured to detect a signal corresponding to an amount of flow of a fluid through the side duct. The side duct comprises a first portion and a second portion. The first portion of the side duct comprises the mass flow sensor. The first portion of the side duct is arranged within the feed duct.

15 Claims, 5 Drawing Sheets

COMBUSTION APPARATUS WITH MASS FLOW SENSOR

CROSS-REFERENCE TO RELATED APPLICATIONS

This application claims priority to EP Application No. 22184530.8 filed Jul. 12, 2022, the contents of which are hereby incorporated by reference in their entirety.

TECHNICAL FIELD

The present disclosure deals with combustion systems. Various embodiments of the teachings herein include systems and/or methods for addressing condensation on mass flow sensors of a combustion apparatus.

BACKGROUND

A side duct that is connected to the side of a feed duct of a combustion apparatus is described in European patent EP3301362B1. A sensor is arranged in the side duct to measure the flow of a fluid, such as air for example. As a result of the fluid connection between side duct and feed duct the flow through the feed duct can be deduced from the flow in the side duct.

A further European patent EP3301363B1 deals with a combustion facility with burner and an apparatus for measuring the throughflow of turbulent flows. Like EP3301362B1, EP3301363B1 discloses a side duct, which connects to an air duct. In the side duct from EP3301362B1 a mass flow sensor projects into the duct. There is a connection point of the side duct, via which the side duct has a fluid connection to the feed duct. Located on the other side of the side duct is an outlet, which leads directly into the combustion chamber or into the outer area of the combustion apparatus.

A combustion apparatus with feed duct and side duct is furthermore disclosed in European patent EP3301364B1 dealing with a combustion facility with burner and an apparatus for measuring throughflow in turbulent flows. European patent EP3301364B1 describes a combustion apparatus with feed duct and side duct is claimed, wherein a mass flow sensor projects into the feed duct. A congestion probe is arranged at the connection between feed duct and side duct. That congestion probe has a sub area that faces toward the outlet of the feed duct. In this case that sub area that faces toward the outlet of the feed duct is at the same time the inlet of the congestion probe. The congestion probe and the feed duct accordingly make possible the entry of a fluid, such as for example air, via an inlet of the congestion probe directed in a downstream direction.

In arrangements with side duct and mass flow sensor in the side duct it is possible for condensation to occur on the mass flow sensor. Furthermore condensation can occur in the side duct. Condensation occurs when the temperature of the fluid, such as for example air in the side duct and/or in the environment of the mass flow sensor, falls below its dew point, at least locally. In this case the temperature of the dew point is a function of the humidity and/or of the partial pressure of the water vapor pp in a dry fluid, for example air.

For example, a surface of the side duct and/or of the mass flow sensor can have a temperature that lies below the dew point temperature of the fluid contained in the water vapor. In particular a surface of the side duct and/or of the mass flow sensor can have a temperature that lies below the dew point temperature of the water vapor contained in the inlet air. On such a surface the danger of condensation then exists. As a result electrical contacts within the sensor can be short circuited by moisture. It is also possible for an anemometric sensor, as a consequence of the wetting of surfaces with water, to provide measurement results that are incorrect or imprecise and/or for no measurement results to be provided.

For avoidance of condensation on or around the sensor, it would be possible to heat the surfaces in the environment of the sensor to a temperature of above the dew point. In the meantime the heating apparatus to be installed represents an additional component, of which the failure could call into question the operational safety of the system. Moreover additional costs for the heating are incurred during operation.

It is further conceivable, instead of flow rate sensors such as mass flow sensors, to employ pressure sensors. In this case what becomes important is that pressures are typically detected without any flows. Pressure sensors, in the case of condensation, therefore throw up fewer problems than anemometric sensors. In the meantime pressure sensors at least do not deliver direct signals, which allow a flow in a feed duct to be deduced.

SUMMARY

The teachings of the present disclosure is an arrangement for avoidance of condensation and/or dew formation on a flow rate sensor and also in the environment of the sensor. Moreover a stable flow distribution relationship between feed duct and side duct is to be guaranteed. In particular the flow behavior should not change by the avoidance of condensation and/or dew formation.

For example, some embodiments include a combustion apparatus comprising a burner (1), a side duct (24) and a feed duct (11); wherein the side duct (24) comprises an inlet, an outlet and a mass flow sensor (13) between the inlet and the outlet of the side duct (24); wherein the mass flow sensor (13) is configured to detect a signal corresponding to an amount of flow (15) of a fluid through the side duct (24); wherein the side duct (24) comprises a first portion and a second portion; wherein the first portion of the side duct (24) comprises the mass flow sensor (13); and wherein the first portion of the side duct (24) is arranged within the feed duct (11).

In some embodiments, the first portion of the side duct (24) comprises at least one flow restriction element (14); and the at least one flow restriction element (14) further subdivides the first portion into a third portion facing toward the mass flow sensor (13) and a fourth portion facing away from the mass flow sensor (13) and has a passage surface for a passage of the fluid between the third portion of the side duct (24) and the fourth portion of the side duct (24).

In some embodiments, the first portion of the side duct (24) projects at least ten millimeters into the feed duct (11).

In some embodiments, the feed duct (11) has an inner side and an inner wall; the inner wall of the feed duct (11) is arranged on the inner side of the feed duct (11) and the inner wall of the feed duct (11) surrounds the inner side of the feed duct (11); and a shortest distance between the inner wall of the feed duct (11) and the mass flow sensor (13) amounts to at least one millimeter.

In some embodiments, the feed duct (11) has an inner side and an inner wall; the inner wall of the feed duct (11) is arranged on the inner side of the feed duct (11) and the inner wall of the feed duct (11) surrounds the inner side of the feed duct (11); and a shortest distance between the inner wall of the feed duct (11) and the at least one flow restriction element (14) amounts to at least one millimeter.

In some embodiments, a shortest distance between the inner wall of the feed duct (11) and the mass flow sensor (13) amounts to at least one millimeter; and a shortest distance between the inner wall of the feed duct (11) and the at least one flow restriction element (14) amounts to at least five millimeters.

In some embodiments, the mass flow sensor (13) is flush with the inner wall of the side duct (24) or projects into the side duct (24).

In some embodiments, the combustion apparatus comprises a signal line (17), which is connected to the mass flow sensor (13); the signal line (17) has a first portion; and the first portion of the signal line (17) is embedded in a wall of the side duct (24).

In some embodiments, the feed duct (11) has a fluid connection to the burner (1).

In some embodiments, the side duct (24) has a fluid connection to the feed duct (11) via a connection point (12).

In some embodiments, the feed duct (11) has an inlet (23); and a shortest distance between the inlet (23) of the feed duct (11) and the side duct (24) amounts to less than one thousand millimeters.

In some embodiments, the outlet of the side duct (24) has a fluid connection to the inlet of the side duct (24).

In some embodiments, a or the connection point (12) comprises the inlet of the side duct (24) and wherein the feed duct (11) comprises a flap (4); the side duct (24) has a fluid connection to the feed duct (11) via the connection point (12); the side duct (24) has a fluid connection to the feed duct (11) via the outlet of the side duct (24); and the flap (4) in the feed duct (11) is arranged between the inlet and the outlet of the side duct (24).

In some embodiments, the side duct (24) comprises a first and a second end; the second end of the side duct (24) is different from first end of the side duct (24) and the second end of the side duct (24) lies opposite the first end of the side duct (24); and the first end of the side duct (24) comprises a connection point (12) in the form of the inlet of the side duct (24) and the second end of the side duct comprises the outlet of the side duct (24).

In some embodiments, the side duct (24) comprises a first and a second end; the second end of the side duct (24) is different from first end of the side duct (24) and the second end of the side duct (24) lies opposite the first end of the side duct (24); and the first end of the side duct (24) comprises a connection point (12) in the form of the outlet of the side duct (24) and the second end of the side duct comprises the inlet of the side duct (24).

BRIEF DESCRIPTION OF THE DRAWINGS

Various details will be accessible to the person skilled in the art with the aid of the more detailed description given below. The individual forms of embodiment in this case are not restrictive. In the drawings.

DETAILED DESCRIPTION

Figure 1:
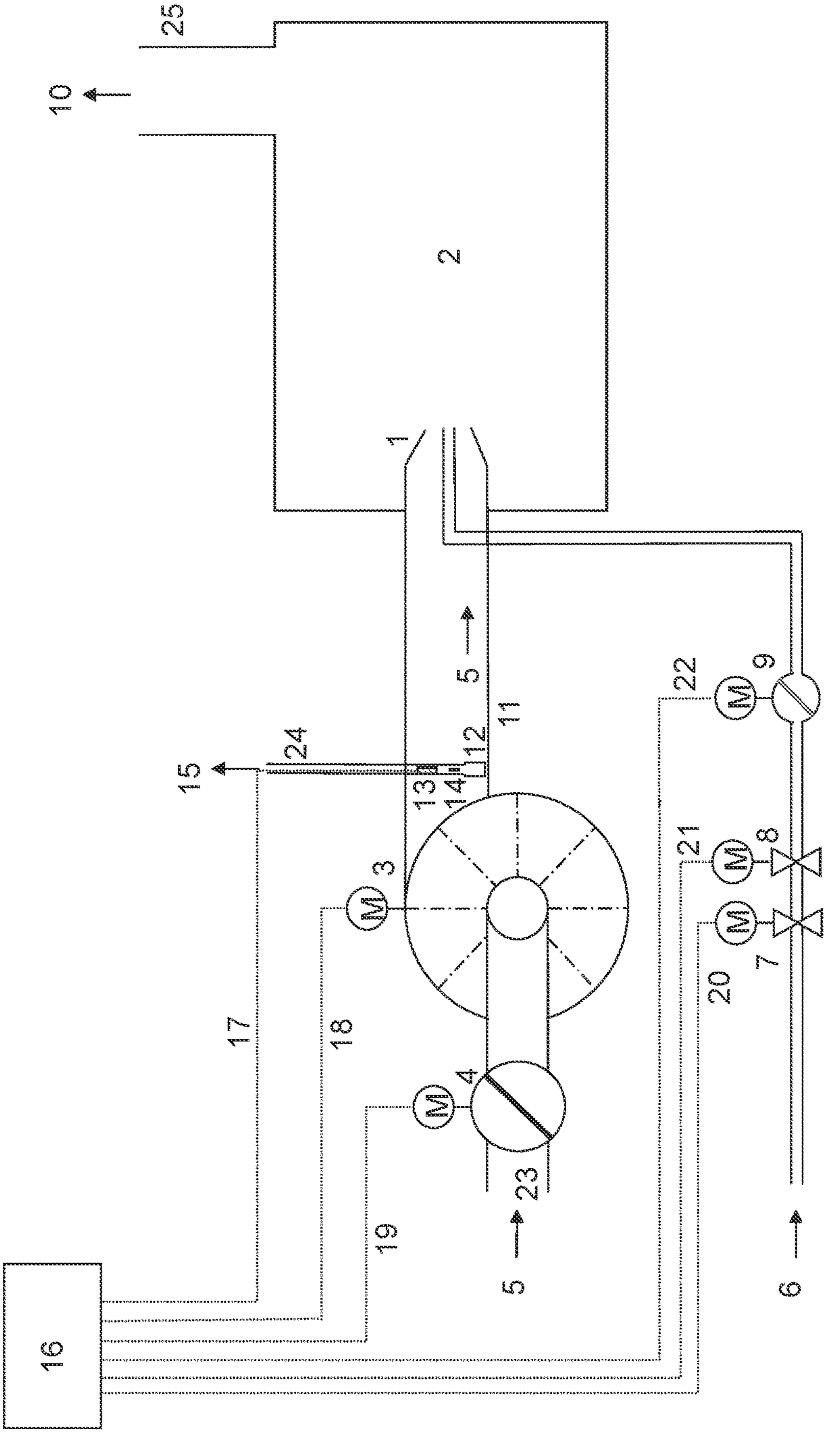
FIG. 1 shows a schematic of a combustion apparatus with a side duct to a feed duct between fan and combustion chamber incorporating teachings of the present disclosure.

The teachings of the present disclosure include a combustion apparatus with a feed duct and a side duct to the feed duct. A mass flow sensor is arranged in the side duct. In this case condensation and/or dew formation on or around the mass flow sensor are to be avoided. To this end, the side duct in which the mass flow sensor is located is arranged partly within the feed duct. This means that a first portion of the side duct is located within the feed duct. A second portion of the side duct is located outside the feed duct. Thus the mass flow sensor is located within the walls that delimit the feed duct externally.

In practice, the fluid in the feed duct has a temperature above the dew point temperature of the water vapor contained in the fluid. In particular it is assumed that the fluid in the feed duct has a temperature above the dew point temperature of the water vapor contained in the inlet air. The arrangement of the first portion of the side duct and of the mass flow sensor within the feed duct means that the fluid in the feed duct and the side duct have the same temperatures. Likewise the mass flow sensor has the same temperature as the fluid in the feed duct and as the side duct. The water vapor in the fluid can no longer condense because the walls of the side duct have a temperature that is not lower than the temperature of the fluid. The water vapor in the fluid can in particular no longer condense because the walls of the side duct have a temperature that is not lower than the temperature of the inlet air. The water vapor in the fluid can furthermore not condense because the mass flow sensor has a temperature that is not lower than the dew point temperature of the water vapor in the fluid. The water vapor in the fluid can in particular not condense because the mass flow sensor has a temperature that is not lower than the dew point temperature of the water vapor in the inlet air.

In some embodiments, the side duct and the feed duct are arranged in a volume with homogeneous temperature distribution. In some embodiments, the side duct and the feed duct are arranged in a volume with homogeneous distribution of the partial pressure of the water vapor $p_D$. Thus the mass flow sensor is also arranged in that volume with homogeneous distribution of temperature and/or partial pressure of the water vapor $p_D$. Through the homogeneous distribution of temperature and/or partial pressure of the water vapor $p_D$ the fluid condenses either everywhere or at no location within the volume with homogeneous distribution. In practice the arrangement within a volume with homogeneous distribution of the temperature and/or of the partial pressure of the water vapor $p_D$ is achieved by the respective distances between the side duct,
the inlet of the feed duct and
the mass flow sensor being selected as small distances. In any event the respective distances between the side duct,
the inlet of the feed duct and
the mass flow sensor are also to be selected as small distances.

In some embodiments, the side duct comprises a bypass duct, which takes a fluid out of the feed duct and lets it flow back again into the feed duct. In addition the side duct can be insulated with a layer made of a heat proofing material. These measures enable it to be avoided that, within the side duct and in particular on the walls of the side duct, temperatures of below the dew point temperature of water vapor contained in the fluid occur. It is thereby avoided in particular that, within the side duct and in particular on the walls of the side duct, temperatures of below the dew point temperature of the water vapor contained in the inlet air occur. Furthermore these measures avoid temperatures of below the dew point temperature of water vapor contained in the fluid occurring at the mass flow sensor. In particular it is avoided thereby that temperatures of below the dew point temperature of the water vapor contained in the inlet air occur at the mass flow sensor.

FIG. 1 shows a system comprising a burner 1, a heat consumer 2, a fan 3 with adjustable speed and a motor-adjustable air flap 4 incorporating teachings of the present disclosure. The motor-adjustable flap 4 is arranged after the air intake 23. The heat consumer 2 (heat exchanger) can for example be a warm water heating vessel. The feed (particle flow and/or mass flow) 5 of the fluid air can be adjusted in accordance with FIG. 1 by the motor-adjustable air flap 4. The feed (particle flow and/or mass flow) 5 of the fluid air can also be adjusted in accordance with FIG. 1 by a preset speed with the aid of a signal line 18 of the fan 3.

In the absence of an air flap 4 and/or with a fixed air flap the air feed 5 can also be adjusted just by the speed of the fan 3. Pulse width modulation is considered for adjustment of the speed of the fan 3 for example. In accordance with another form of embodiment the motor of the fan 3 is connected to a converter. The speed of the fan 3 is thus adjusted via the frequency of the converter.

In some embodiments, the fan runs at a fixed, non-variable speed. The air feed 5 is determined by the position of the air flap 4. What is more, further actuators are possible, which modify the air feed 5. In such cases this can for example involve a nozzle assembly adjustment of the burner or an adjustable flap in the exhaust gas path.

The fuel feed 6 (for example particle flow and/or mass flow) is set by a fuel flap 9. In some embodiments, the fuel flap 9 is a (motor-adjustable) valve.

Combustible gases such as natural gas and/or propane gas and/or hydrogen come into consideration as fuel for example. A liquid fuel such as heating oil also comes into consideration as fuel. In this case the fuel flap 9 is replaced by a motor-adjustable oil pressure regulator in the return of the oil nozzle. The safety shutdown function and/or safety shutoff function is implemented by the redundant safety shutoff valves 7, 8. In accordance with a specific form of embodiment the safety shutoff valves 7, 8 and the fuel flap 9 are realized as an integrated unit. In some embodiments, the integration can also be set so that one actuator is purely a safety shut off valve and fuel flap and second safety shut off valve are combined in a further actuator.

In some embodiments, the burner 1 is a combustion engine. In particular a combustion engine of a system with power-heat coupling is considered. In such embodiments, fuel is mixed with the air feed 5 in the and/or before the burner 1. The mixture is burned in the combustion chamber of the heat exchanger 2. The heat is transported on into the heat consumer 2. For example heated water is taken away via a pump to heating elements and/or for industry firings a good is (directly) heated. The exhaust gas flow 10 is vented via an exhaust path 25, for example a chimney.

A regulation and/or control and/or supervision facility 16 coordinates all actuators so that the correct feed 6 of fuel is set via the setting of the fuel flap 9 for corresponding air feed 5. This means that the feed 5 of air (mass flow and/or particle flow) in the feed duct 11 is set for each point of the burner power. The desired fuel to air ratio A is thus produced. In accordance with a specific form of embodiment the regulation and/or control and/or supervision facility 16 can be embodied as a microcontroller. Furthermore the regulation and/or control and/or supervision facility 16 can be embodied as a microcontroller circuit. In some embodiments, the regulation and/or control and/or supervision facility 16 can be embodied as a microprocessor. Furthermore the regulation and/or control and/or supervision facility 16 can be embodied as a microprocessor circuit.

To this end the regulation and/or control and/or supervision facility 16 sets the fan 3 via the signal line 18 to the value stored in the facility 16. Likewise the regulation and/or control and/or supervision facility 16 sets the air flap 4 via the signal line 19 to the values stored in the facility 16. The values are stored for example in the regulation and/or control and/or supervision facility 16 in the form of a characteristic curve or table. Preferably the regulation and/or control and/or supervision facility 16 comprises a (non-volatile) memory. Stored in the memory are those values. The setting of the fuel flap 9 is predetermined via the signal line 22. In operation the safety shut off valves 7, 8 are set via the signal lines 20, 21.

If errors of a flap 4, 9 and/or in the fan 3 are to be discovered, this can be done by a safety-oriented alert. What is signaled is the position of the air flap 4 via the signal line 19 for the air flap 4 and/or via the signal line 22 for the fuel flap 9. For example errors in the preferably electronic interface or control facility of the flap 4 or of the fan 3 can be discovered in this way. The signal lines 19 and 22 can be bidirectional signal lines.

In some embodiments, a safety-oriented position alert can be realized via redundant position sensors. If a safety-oriented alert about the speed is necessary, this can be done via the (bidirectional) signal line 18 by using (safety-oriented) speed sensors. To this end for example redundant speed sensors can be used and/or the measured speed compared with the required speed. The activation and response signals can be transferred via different signal lines and/or via a bidirectional bus.

A side duct 24 is fitted before the burner. A (small) amount of flow 15 flows outward through the side duct 24. For example in this case the amount of flow 15 flows into the space from which the fan 3 pulls in the air. In some embodiments, the outflowing amount of flow 15 flows out into the combustion chamber of the heat consumer 2. In some embodiments, the air flows back into the feed duct 11. In this case a fixed or motor-adjustable flow restrictor, in the form of the flap 4 for example, is arranged in the feed duct 11 between tapping off and return.

If the amount of flow is flowing outward then the side duct 24, together with the burner 1 and the exhaust path 25 of the heat consumer 2, forms a flow divider. For a defined flow path through burner 1 and exhaust path 25, for a value of the air feed 5 in each case (reversibly unique), an associated value of an air flow 15 flows out through the side duct 24. The flow path through burner 1 and exhaust path 25 must only be defined in this case for each point of the burner power. It can thus vary over the burner power (and thus over the air feed 5).

The side duct 24, in relation to the feed duct 11 depending on pressure circumstances, can comprise both an outflow duct and also an inflow duct. The side duct 24 can in particular, in relation to the feed duct 11 depending on pressure circumstances, be both an outflow duct and also an inflow duct.

A flow restriction element (in the form of a diaphragm) 14 can be fitted in the side duct 24. The amount of flow 15 of the flow divider is defined with the flow restriction element 14. In some embodiments, the flow restriction element 14 is a diaphragm. The flow restriction element 14 as a defined flow resistance can also be realized by a small tube of defined length (and/or diameter). The function of the flow restriction element 14 can also be realized with the aid of a laminar flow element and/or by another defined flow restriction.

In some embodiments, the passage surface of the flow restriction element 14 is adjustable by a motor. To avoid and/or rectify blockages by floating particles the passage surface of the flow restriction element 14 can be adjusted. In particular the flow restriction element 14 can be opened and/or closed. In some embodiments, the passage surface of the flow restriction element 14 is adjusted multiple times in order to avoid and/or to rectify blockages.

The amount of flow 15 in the side duct 24 depends on the passage surface of the flow restriction element 14. Therefore the value of the air feed 5 is stored via characteristic values for the measured values of the amount of flow 15 for each passage surface of the flow restriction element 14 used stored in the (non-volatile) memory. This enables the air feed 5 to be determined.

With this arrangement the amount of flow 15 (particle flow and/or mass flow) through the side duct 24 is a measure for the air feed 5 to the burner 1. In this case influences as a result of changes in density of the air for example are detected by changes of the absolute pressure and/or of the air temperature by a mass flow sensor 13. Normally the amount of flow 15 is (very) much smaller than the air feed 5.

Thus the air feed 5 is (practically) not influenced by the side duct 24. In some embodiments, the amount of flow 15 through the side duct 24 is smaller by at least a factor of one hundred than the air feed 5 through the feed duct 11. In some embodiments, the amount of flow 15 through the side duct 24 is smaller by at least a factor of one thousand than the air feed 5 through the feed duct 11. In some embodiments, the amount of flow 15 through the side duct 24 is smaller by at least a factor of ten thousand than the air feed 5 through the feed duct 11.

Mass flow sensors 13 allow the measurement at high flow speeds specifically in conjunction with combustion apparatuses in operation. Typical values of such flow speeds lie in ranges between 0.1 meters per second and 5 meters per second. Flow speeds of 10 meters per second, 15 meters per second, 20 meters per second, or even 100 meters per second are also possible. Mass flow sensors 13, which are suitable for the present disclosure are for example OMRON® D6F-W or SENSOR TECHNICS® WBA type sensors. The usable range of these sensors typically begins at speeds of between 0.01 meters per second and 0.1 meters per second. The usable range of these sensors ends at a speed of such as for example 5 meters per second, 10 meters per second or meters per second. The usable range of these sensors can even end at a speed of such as 20 meters per second or 100 meters per second. In other words, lower limits such as 0.1 meters per second can be combined with upper limits such as 5 meters per second or (10?) meters per second. Lower limits such as 0.1 meters per second can further be combined with upper limits such as 15 meters per second or 20 meters per second. Furthermore lower limits such as 0.1 meters per second can be combined with upper limits such as even 100 meters per second.

Figure 2:
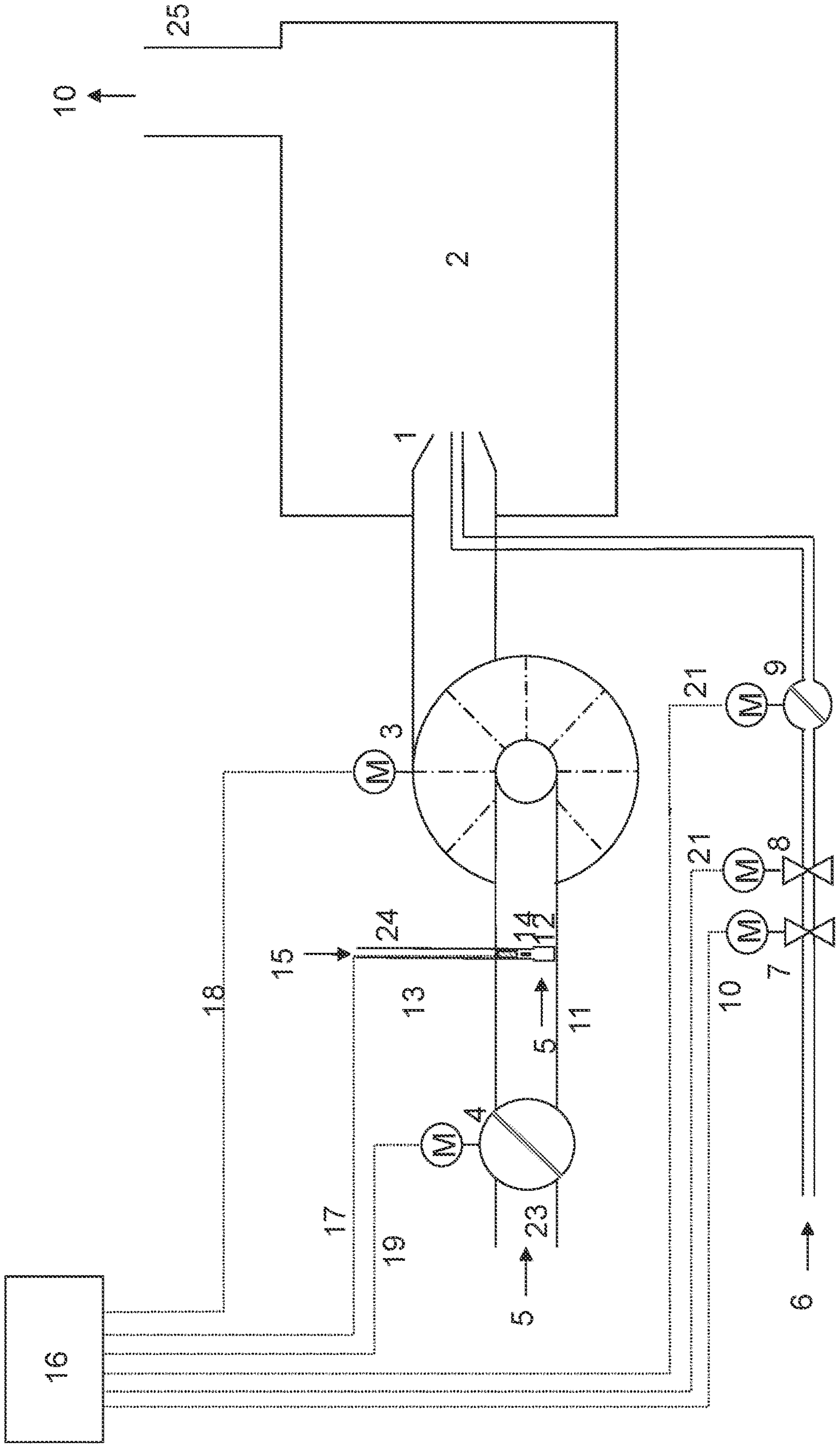
FIG. 2 shows a schematic of a combustion apparatus with a side duct to a feed duct between a flap and a fan incorporating teachings of the present disclosure.

FIG. 2 shows, as a form of embodiment changed compared to FIG. 1, a system with a side duct 24 before the fan 3. By contrast with FIG. 1 the amount of flow 15 flows on the suction side over the mass flow sensor 13. The fan 3 creates a vacuum at this location. In other words, the side duct 24 is an inflow duct.

Changes in the amount of gas as a result of adjustments to the motor-adjustable fuel flap 9 do not influence the amount of flow through the side duct 24. Should the vacuum in the feed of the fan 3 not be sufficient, then a defined flow resistance can be created with a flow restriction element at the air intake 23 of the fan feed. A flow restriction element at the air intake 23 can for example comprise an air flap 4. The flow restriction element at the air intake 23 can for example also be an air flap 4. The air flap 4 is then practically embodied as a motor-adjustable flow restriction element. In some embodiments, the air flap 4 is embodied as a motor-adjustable flow restriction element with feedback. Together with flow restriction element 14 in the side duct 24 a flow divider is realized.

In FIG. 2 the air feed 5 via the fan 3 can be set with the aid of the signal line 18. In some embodiments, a (motor-adjustable) air flap 4 can be constructed. Such an air flap 4 is arranged in FIG. 2 on the suction side in relation to the fan 3. The air through the side duct is sucked in in this case from outside to the connection point 12, since a vacuum is created at this point by fan 3 and air flap 4. The air flap 4 can however be arranged on the pressure side in relation to the fan 3 or can be left out entirely. Then a fixed diaphragm in the feed duct in accordance with FIG. 2 ensures a suction-side arrangement for the vacuum at the connection point 12.

Figure 3:
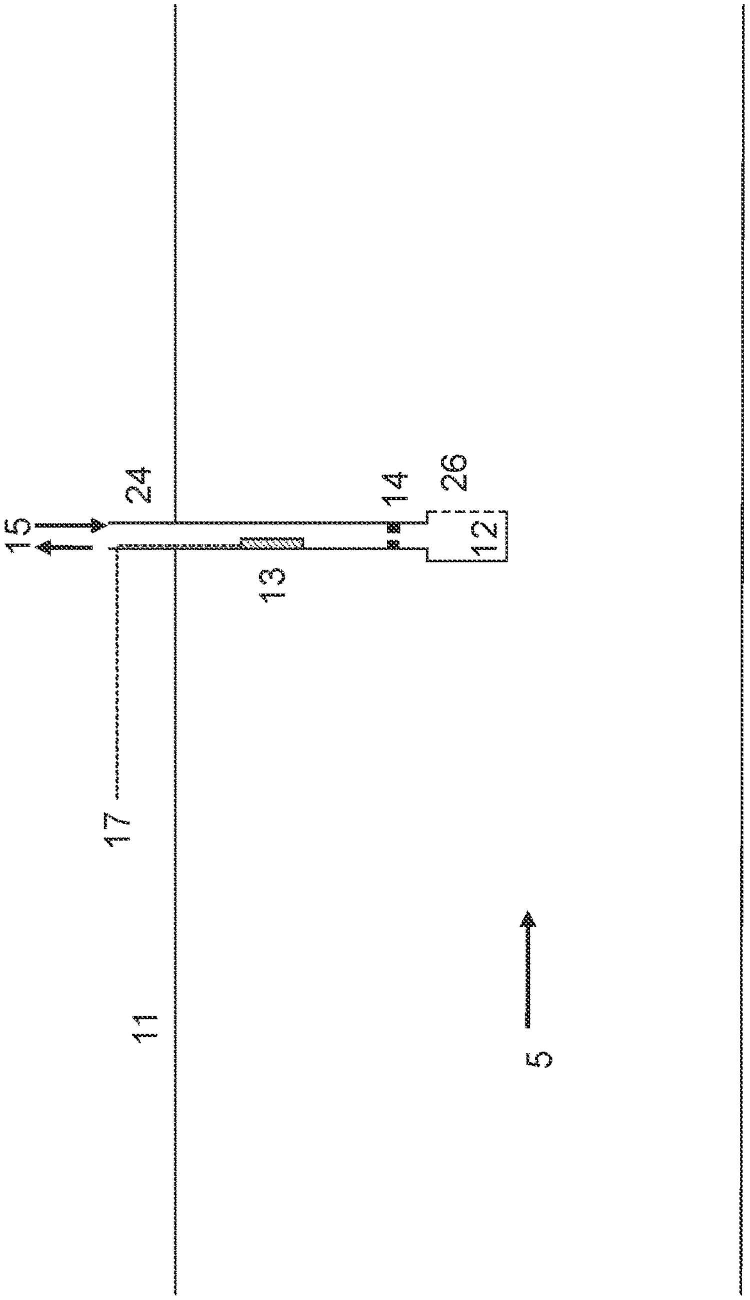
FIG. 3 illustrates a side duct, which projects into a feed duct incorporating teachings of the present disclosure.

FIG. 3 shows a side duct 4, which projects into a feed duct 11. The side duct 24 has a first end, which is arranged within the feed duct 11. The side duct 24 has a second end, which is arranged outside the feed duct 11. The second end of the side duct 24 is different from the first end of the side duct 24. Likewise the side duct 24 has a first portion, which is arranged within the feed duct 11. Furthermore the side duct 24 has a second portion, which is arranged outside the feed duct 11. In a particular form of embodiment the side duct 24 consists of the first portion within the feed duct 11 and the second portion outside the feed duct 11.

In accordance with FIG. 3 a connection point 12 of the side duct 24 is arranged within the feed duct 11. In some embodiments, the connection point 12 comprises a congestion probe. In some embodiments, the connection point 12 is a congestion probe. Openings 26 make a fluid connection between feed duct 11 and side duct 24 possible.

In some embodiments, at least one further element selected from

- a flow restriction element 14, for example a diaphragm, and
- a mass flow sensor 13 is arranged within the feed duct 11.

In FIG. 3 both the flow restriction element 14 in the form of a diaphragm and the mass flow sensor 13 are arranged within the feed duct 11.

In some embodiments, the feed duct 11 comprises a tube with an inner wall and an outer wall. The inner wall of the tube defines an inner side of the feed duct 11. The outer wall of the tube defines an outer side of the feed duct 11. The inner side of the feed duct 11 is different from the outer side of the feed duct 11. An arrangement comprising one or more elements selected from

- the connection point 12, the flow restriction element 14, for example a diaphragm, the mass flow sensor 13, the first portion of the side duct 24, within the feed duct 11 is thus on the inner side of the feed duct 11. In some embodiments, the side duct 24 projects at least millimeters or at least 10 millimeters or at least millimeters into the feed duct 11. In other words, the first portion of the side duct 24 projects at least 5 millimeters or at least 10 millimeters or at least 20 millimeters into the feed duct 11. In particular the shortest distance between the first end of the side duct 24 within the feed duct 11 and the inner wall of the tube amounts to at least 5 millimeters or at least 10 millimeters or at least 20 millimeters. An arrangement of the side duct 24 within the feed duct 11 avoids dew formation on the mass flow sensor 13 for example.

In some embodiments, the feed duct 11 comprises a tube with an inner wall and an outer wall. The inner wall of the tube defines an inner side of the feed duct 11. The outer wall of the tube defines an outer side of the feed duct 11. The inner side of the feed duct 11 is different from the outer side of the feed duct 11. An arrangement comprising one or more elements selected from the connection point 12, the flow restriction element 14, for example a diaphragm the mass flow sensor 13, the first portion of the side duct 24, within the feed duct 11 is thus on the inner side of the feed duct 11. In some embodiments, the side duct 24 projects at least 5 millimeters or at least 10 millimeters or at least 20 millimeters into the feed duct 11. In other words, the first portion of the side duct 24 projects at least 5 millimeters or at least 10 millimeters or at least 20 millimeters into the feed duct 11. In particular the shortest distance between the first end of the side duct 24 within the feed duct 11 and the inner wall of the tube amounts to at least 5 millimeters or at least 10 millimeters or at least 20 millimeters. An arrangement of the side duct 24 within the feed duct 11 avoids dew formation of the mass flow sensor 13 for example.

Figure 4:
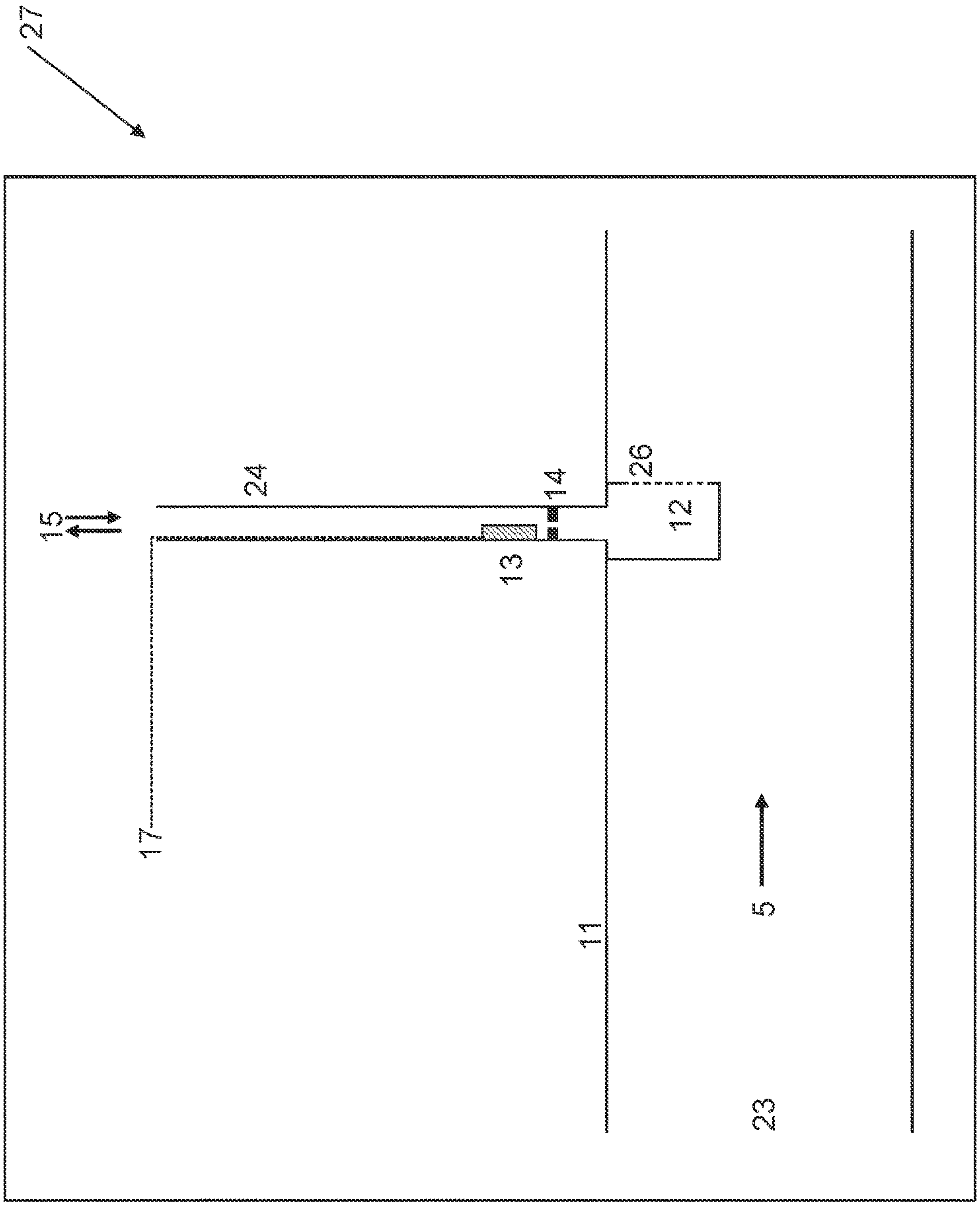
FIG. 4 illustrates a combustion apparatus with feed duct and with side duct, wherein the feed duct and the side duct are connected to the same ambient air incorporating teachings of the present disclosure.

FIG. 4 illustrates an arrangement whereby the air intake 23 of the feed duct 11 and the air intake and/or air outlet of the side duct 24 is accommodated in an air volume 27 with homogeneous temperature distribution. In some embodiments, the temperature in the air volume 27 with homogeneous temperature distribution varies between temperature maximum and temperature minimum by less than 2 Kelvin. In some embodiments, the temperature in the air volume 27 with homogeneous temperature distribution varies between temperature maximum and temperature minimum by less than 1 Kelvin. In some embodiments, the temperature in the air volume 27 with homogeneous temperature distribution varies between temperature maximum and temperature minimum by less than 0.5 Kelvin. A temperature distribution in the air volume 27 that is as homogeneous as possible avoids condensation, in that surfaces of the feed duct 11 and/or of the side duct 24 do not become so cold that the dew point is (essentially) undershot.

In some embodiments, the air volume 27 with homogeneous temperature distribution also has a homogeneous distribution of the partial pressures of the water vapor $p_D$. In some embodiments, the partial pressure of the water vapor $p_D$ in the air volume 27 varies between maximum partial pressure and minimum partial pressure by less than 2 percent. In some embodiments, the partial pressure of the water vapor $p_D$ in the air volume 27 varies between maximum partial pressure and minimum partial pressure by less than 1 percent. In some embodiments, the partial pressure of the water vapor pp in the air volume 27 varies between maximum partial pressure and minimum partial pressure by less than 0.5 percent. A distribution of the partial pressures of the water vapor $p_D$ in the air volume 27 that is as homogeneous as possible avoids condensation. Such condensation is avoided by the dew point locally on the surfaces of the feed duct 11 and/or of the side duct 24 essentially not being undershot.

In the example shown in FIG. 4, a first end of the side duct 24 is arranged in the feed duct 11. A second end of the side duct 24, which is different from the first end of the side duct 24, is arranged outside the feed duct 11. The air volume 27 with homogeneous temperature distribution accordingly comprises the air intake 23 of the feed duct 11 and the second end of the side duct 24. In some embodiments, the air volume 27 with homogeneous distribution of the partial pressures of the water vapor $p_D$ comprises the air intake 23 of the feed duct 11 and the second end of the side duct 24.

Likewise in FIG. 4 the flow restriction element 14, for example a diaphragm, the mass flow sensor 13 and the signal line 17 to the mass flow sensor 13 are arranged outside the feed duct 11. In other words, the second end of the side duct 24, the flow restriction element 14, the mass flow sensor 13 and the signal line 17 are located in the air volume 27 with homogeneous temperature distribution. In some embodiments, these elements are located within the air volume 27 with homogeneous distribution of the partial pressure of the water vapor $p_D$.

Figure 5:
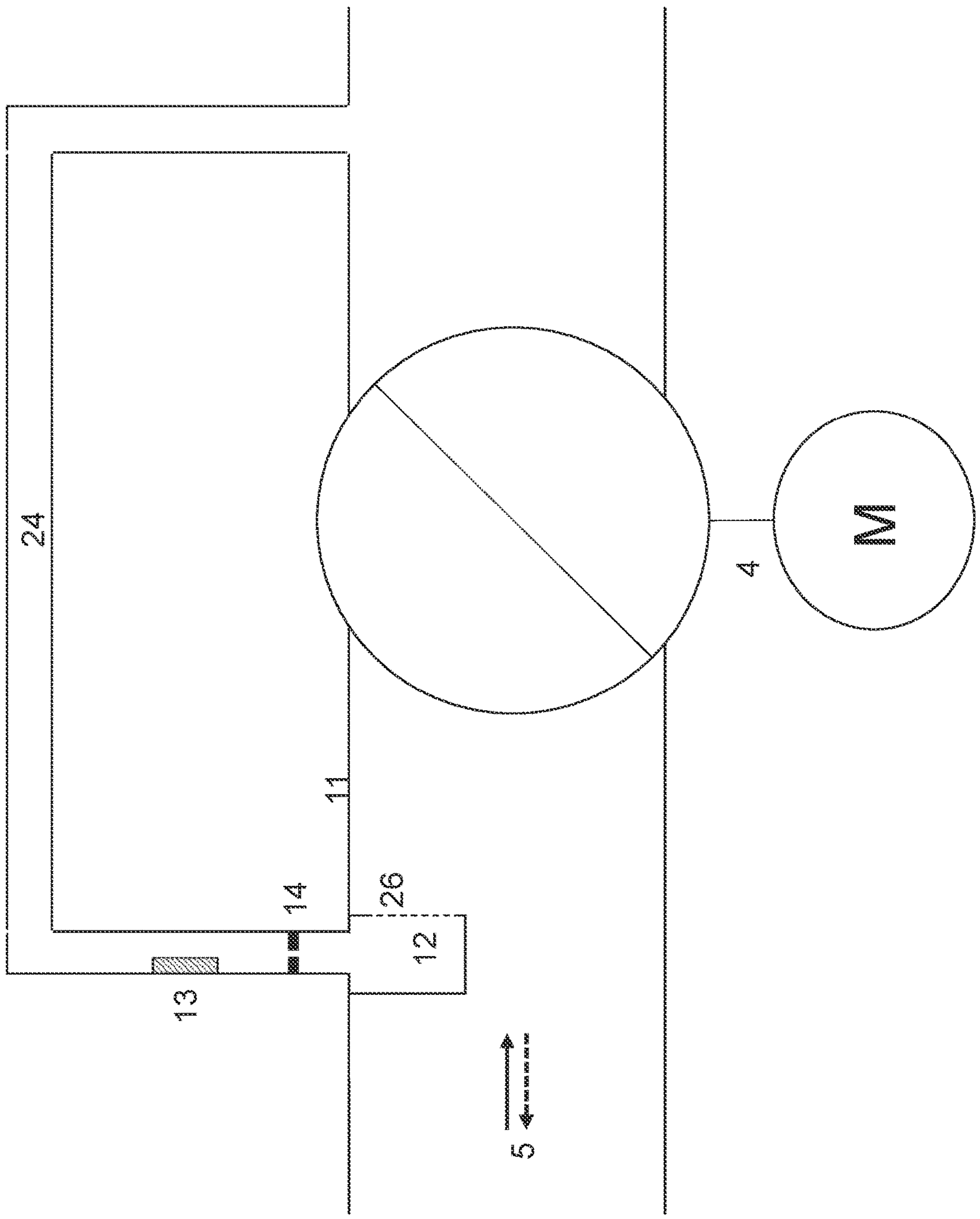
FIG. 5 shows a schematic of a side duct to a feed duct, wherein the side duct forms a bypass duct of the feed duct incorporating teachings of the present disclosure.

FIG. 5 shows a side duct 24 embodied as a bypass duct. In other words, the side duct 24 has a first end, which is connected to the feed duct 11. In some embodiments, the first end of the side duct 24 is connected with the aid of a connection point 12 to the feed duct 11. The side duct 24 shown in FIG. 5 has a second end. The second end of the side duct 24 is different from the first end of the side duct 24 and is likewise connected to the feed duct 11. This means that the side duct 24 has a fluid connection to the feed duct 11 at its first end and at its second end. In this form of embodiment the air flows back into the feed duct 11. In this case a fixed or motor-adjustable flow restriction, for example in the form of the flap 4, is arranged in the feed duct between tap off and return.

In some embodiments, the side duct 24 embodied as a bypass duct is thermally insulated with the aid of a heat proofing material. For example the side duct 24 embodied as a bypass duct can be insulated with the aid of polystyrenes. Furthermore it is envisioned that the side duct 24 embodied as a bypass duct is insulated with the aid of at least one heat proofing material selected from calcium silicate sheets, mineral wool such as for example glass wool and/or rock wool, mineral foam sheets, porous concrete.

In some embodiments, the side duct 24 comprises a tube with an inner side and an outer side. Fitted to the outer side of the tube of the side duct 24 embodied as a bypass duct is a heat proofing material. In particular an aforementioned heat proofing material can be fitted to the outer side of the tube of side duct 24 embodied as a bypass duct. A heat proofing of side duct 24 embodied as a bypass duct avoids condensation, in that a dew point temperature is not undershot locally.

FIG. 4 and FIG. 5 show the mass flow sensor 13 and the flow restriction element 14 outside the feed duct 11. In some embodiments, at least one element of an arrangement selected from the flow restriction element 14, for example a diaphragm, the mass flow sensor 13, can be fitted within the feed duct 11. In this case the air intake 23 of the feed duct 11 and the second end of the side duct 24 are arranged in the air volume with homogeneous temperature distribution. In some embodiments, the air intake 23 of the feed duct 11 and the second end of the side duct 24 can be arranged in the air volume with homogeneous distribution of the partial pressure of the water vapor pp.

In some embodiments, at least one element selected from the flow restriction element 14, for example a diaphragm, the mass flow sensor 13, can be fitted within the feed duct 11. In this case the side duct 24 is embodied as a bypass duct. The at least one element is arranged in an area of the side duct that has the inlet air in the feed duct swirling around it. The part of the side duct with the at least one element can be installed both upstream in the flow, i.e. before the fixed or motor-adjustable flow restriction. The side part of the duct with the at least one element can also be installed in this case in the downstream flow, i.e. after the fixed or motor-adjustable flow restriction.

In some embodiments, the at least one element can comprise the mass flow sensor 13. The at least one element can in particular be the mass flow sensor 13.

FIG. 1 to FIG. 5 show a mass flow sensor 13 in the side duct 24. In some embodiments, the mass flow sensor 13 projects into the side duct 24. For example the mass flow sensor 13 can project at least 0.5 millimeters or at least 1 millimeter or at least 2 millimeters into the side duct 24. In that the mass flow sensor 13 projects into the side duct 24 its sensor elements for detecting and amount of flow 15 are positioned within the side duct 24.

In some embodiments, the mass flow sensor is mounted flush with the inner wall of the side duct 24. With this positioning too the sensor elements detect an amount of flow within the side duct 24. In this case turbulences are avoided that are possibly caused by the edges of the sensor. By the avoidance of turbulences more stable signals are obtained.

In some embodiments, the side duct 24 or parts of the side duct 24 are manufactured with an additive manufacturing method such as three-dimensional printing. In some embodiments, the side duct 24 or parts of the side duct 24 can be manufactured by selective laser sintering.

Some embodiments include a combustion apparatus comprising a burner (1), a side duct (24) and a feed duct (11); wherein the side duct (24) comprises an inlet, an outlet and a mass flow sensor (13) between the inlet and the outlet of the side duct (24); wherein the mass flow sensor (13) is configured to detect a signal corresponding to an amount of flow (15) of a fluid through the side duct (24); wherein the side duct (24) comprises a first portion and a second portion; wherein the first portion of the side duct (24) comprises the mass flow sensor (13); and wherein the first portion of the side duct (24) is arranged within the feed duct (11).

In some embodiments, the mass flow sensor is or comprises a mass flow rate sensor.

In some embodiments, the mass flow sensor is configured to detect a signal indicative of a flow rate of a fluid through the side duct (24).

In some embodiments, the first portion is or comprises a first section. In some embodiments, the second portion is or comprises a second section.

In some embodiments, the second portion of the side duct (24) is arranged outside the feed duct (11). In some embodiments, the second portion of the side duct (24) adjoins the feed duct (11).

In some embodiments, the feed duct (11) comprises an air feed duct. The feed duct (11) is ideally an air feed duct. In some embodiments, the fluid is air.

In some embodiments, the mass flow sensor (13) is an anemometric mass flow sensor. In some embodiments, the mass flow sensor (13) is embodied, under constant power, to detect the signal according to the amount of flow (15) of the fluid through the side duct (24). In some embodiments, the mass flow sensor (13) is embodied, under constant temperature, to detect the signal according to the amount of flow (15) of the fluid through the side duct (24). In some embodiments, the signal is detected according to the amount of flow (15) of the fluid through the side duct under constant overtemperature in relation to an environment.

In some embodiments, the side duct (24) comprises a measuring duct. In some embodiments, the side duct (24) is a measuring duct. The side duct (24) is different from the feed duct (11). The side duct (24) is different from the burner (1). The feed duct (11) is different from the burner (1).

The inlet of the side duct (24) is different from outlet of the side duct (24). In particular the side duct (24) can have a first end and a second end, wherein the second end is different from the first end and the second end lies opposite the first end. The inlet of the side duct (24) is arranged at the first end of the side duct (24). The outlet of the side duct (24) is arranged at the second end of the side duct (24).

The first portion of the side duct (24) is arranged within the feed duct (11) so that the mass flow sensor (13) is arranged within the feed duct (11). The first portion of the side duct (24) preferably projects into the feed duct (11) so that the mass flow sensor (13) is arranged within the feed duct (11).

The first portion of the side duct (24) is different from the second portion of the side duct (24).

In some embodiments, the first portion of the side duct (24) comprises the inlet of the side duct (24) in the form of the connection point (12) and/or the openings (26) of the connection point (12). In some embodiments, the second portion of the side duct (24) comprises the outlet of the side duct (24). In some embodiments, the second portion of the side duct (24) may be arranged outside the feed duct (11).

In some embodiments, the first portion of the side duct (24) comprises at least one flow restriction element (14); and the at least one flow restriction element (14) further subdivides the first portion into at third portion facing toward the mass flow sensor (13) and a fourth portion facing away from the mass flow sensor (13) and has a passage surface for a passage of the fluid between the third portion of the side duct (24) and the fourth portion of the side duct (24).

In some embodiments, the third portion is or comprises a third section. In some embodiments, the fourth portion is or comprises a fourth section. The first portion of the side duct (24) is arranged within the feed duct (11), so that the at least one flow restriction element (14) is arranged within the feed duct (11). In some embodiments, the first portion of the side duct (24) projects into the feed duct (11) so that the at least one flow restriction element (14) is arranged within the feed duct (11).

In some embodiments, the at least one flow restriction element (14) comprises a diaphragm, for example a motor-adjustable diaphragm. In some embodiments, the at least one flow restriction element (14) is a diaphragm, for example a motor-adjustable diaphragm.

The third portion of the side duct (24) is different from the fourth portion of the side duct (24).

In some embodiments, there is at least one flow restriction element (14), wherein the at least one flow restriction element (14) projects at least half a millimeter into the side duct (24).

In some embodiments, there is at least one flow restriction element (14), wherein the at least one flow restriction element (14) projects at least one millimeter into the side duct (24).

In some embodiments, there is at least one flow restriction element (14), wherein the at least one flow restriction element (14) projects at least two millimeters into the side duct (24).

In that the at least one flow restriction element (14) projects into the side duct (24), the at least one flow restriction element (14) acts on the amount of flow (15) of the fluid through the side duct (24). Thus a rise in the amount of flow (15), which can lead to dew formation on the mass flow sensor (13), is avoided. The reduced amount of flow (15) can further reduce the dust load. What is more the flow speed over the sensor (13) can be adapted so that the signals make a good evaluation (resolution) possible.

In some embodiments, the first portion of the side duct (24) projects at least ten millimeters into the feed duct (11).

In some embodiments, the first portion of the side duct (24) projects at least thirty millimeters into the feed duct (11). In some embodiments, the first portion of the side duct (24) projects at least fifty millimeters into the feed duct (11). In that the first portion of the side duct (24) projects into the feed duct (11) the dew formation on the mass flow sensor (13) is avoided. A dew formation is avoided because the mass flow sensor (13) is thus kept at the same temperature as the fluid.

In some embodiments, a shortest distance between the inner wall of the feed duct (11) and the mass flow sensor (13) amounts to at least one millimeter.

In some embodiments, a shortest distance between the inner wall of the feed duct (11) and the mass flow sensor (13) amounts to at least three millimeters.

In some embodiments, a shortest distance between the inner wall of the feed duct (11) and the mass flow sensor (13) amounts to at least ten millimeters.

In some embodiments, a shortest distance between the cylindrical inner wall of the feed duct (11) and the mass flow sensor (13) amounts to at least one millimeter.

In some embodiments, a shortest distance between the cylindrical inner wall of the feed duct (11) and the mass flow sensor (13) amounts to at least three millimeters.

In some embodiments, a shortest distance between the cylindrical inner wall of the feed duct (11) and the mass flow sensor (13) amounts to at least ten millimeters.

In some embodiments, the side duct (24) does not comprise the inner wall of the feed duct (11). The inner wall of the feed duct (11) is different from the side duct (24). A sufficient distance of the mass flow sensor (13) from the inner wall of the feed duct (11) further contributes to avoiding dew formation on the mass flow sensor (13).

In some embodiments, a shortest distance between the inner wall of the feed duct (11) and the at least one flow restriction element (14) amounts to at least one millimeter.

In some embodiments, a shortest distance between the inner wall of the feed duct (11) and the at least one flow restriction element (14) amounts to at least three millimeters.

In some embodiments, a shortest distance between the inner wall of the feed duct (11) and the at least one flow restriction element (14) amounts to at least ten millimeters.

In some embodiments, a shortest distance between the cylindrical inner wall of the feed duct (11) and the at least one flow restriction element (14) amounts to at least one millimeter.

In some embodiments, a shortest distance between the cylindrical inner wall of the feed duct (11) and the at least one flow restriction element (14) amounts to at least three millimeters.

In some embodiments, a shortest distance between the cylindrical inner wall of the feed duct (11) and the at least one flow restriction element (14) amounts to at least ten millimeters.

A sufficient distance of the at least one flow restriction element (14) from the inner wall of the feed duct (11) further contributes to avoidance of dew formation on the mass flow sensor (13).

In some embodiments, a shortest distance between the inner wall of the feed duct (11) and the mass flow sensor (13) amounts to at least one millimeter; and a shortest distance between the inner wall of the feed duct (11) and the at least one flow restriction element (14) amounts to at least five millimeters.

In some embodiments, a shortest distance between the inner wall of the feed duct (11) and the mass flow sensor (13) amounts to at least five millimeters; and a shortest distance between the inner wall of the feed duct (11) and the at least one flow restriction element (14) amounts to at least one millimeter.

In some embodiments, a shortest distance between the inner wall of the feed duct (11) and the mass flow sensor (13) amounts to at least three millimeters; and a shortest distance between the inner wall of the feed duct (11) and the at least one flow restriction element (14) amounts to at least three millimeters.

In some embodiments, a shortest distance between the inner wall of the feed duct (11) and the mass flow sensor (13) amounts to at least ten millimeters; and a shortest distance between the inner wall of the feed duct (11) and the at least one flow restriction element (14) amounts to at least ten millimeters.

In some embodiments, a shortest distance between the cylindrical inner wall of the feed duct (11) and the mass flow sensor (13) amounts to at least one millimeter; and a shortest distance between the cylindrical inner wall of the feed duct (11) and the at least one flow restriction element (14) amounts to at least five millimeters.

In some embodiments, a shortest distance between the cylindrical inner wall of the feed duct (11) and the mass flow sensor (13) amounts to at least five millimeters; and a shortest distance between the cylindrical inner wall of the feed duct (11) and the at least one flow restriction element (14) amounts to at least one millimeter.

In some embodiments, a shortest distance between the cylindrical inner wall of the feed duct (11) and the mass flow sensor (13) amounts to at least three millimeters; and a shortest distance between the cylindrical inner wall of the feed duct (11) and the at least one flow restriction element (14) amounts to at least three millimeters.

In some embodiments, a shortest distance between the cylindrical inner wall of the feed duct (11) and the mass flow sensor (13) amounts to at least ten millimeters; and a shortest distance between the cylindrical inner wall of the feed duct (11) and the at least one flow restriction element (14) amounts to at least ten millimeters.

A sufficient distance of the mass flow sensor (13) and of the at least one flow restriction element (14) from the inner wall of the feed duct (11) contributes to avoidance of dew formation on the mass flow sensor (13).

In some embodiments, the mass flow sensor (13) is flush with an inner wall of the side duct (24) or projects into the side duct (24).

In some embodiments, an inner wall of the side duct (24) has an indentation; and the mass flow sensor (13) is arranged in the indentation. In some embodiments, the mass flow sensor (13) is arranged in the indentation so that the mass flow sensor (13) is flush with the inner wall of the side duct (24).

In some embodiments, the mass flow sensor (13) projects at least half a millimeter into the side duct (24). In some embodiments, the mass flow sensor (13) projects at least one millimeter into the side duct (24). In some embodiments, the mass flow sensor (13) projects at least two millimeters into the side duct (24).

The mass flow sensor (13) is flush with an inner wall of the side duct (24) or projects into the side duct (24). Thus its sensor elements are positioned for detection of the signal according to the amount of flow (15) of the fluid through the side duct (24).

In some embodiments, the combustion apparatus comprises a signal line (17), which is connected to the mass flow sensor (13); wherein the first portion of the signal line (17) is embedded in a wall of the side duct (24). In some embodiments, the wall of the side duct (24) is an outer wall of the side duct (24).

In some embodiments, the combustion apparatus comprises a signal line (17) electrically connected to the mass flow sensor (13); wherein the first portion of the signal line (17) is embedded in a wall of the side duct (24).

In some embodiments, the signal line (17) is galvanically connected to the mass flow sensor (13); wherein the first portion of the signal line (17) is embedded in a wall of the side duct (24).

In some embodiments, the signal line (17) is optically connected to the mass flow sensor (13); and the first portion of the signal line (17) is embedded in a wall of the side duct (24).

In some embodiments, the signal line (17) is connected to the mass flow sensor (13). In some embodiments, the signal line (17) is electrically connected to the mass flow sensor (13). In some embodiments, the signal line (17) is connected electrically and mechanically to the mass flow sensor (13). In some embodiments, the signal line (17) is connected directly to the mass flow sensor (13). In some embodiments, the signal line (17) is connected directly and electrically to the mass flow sensor (13). In some embodiments, the signal line (17) is connected directly and electrically and mechanically to the mass flow sensor (13). In some embodiments, a signal line (17) is connected electrically to the mass flow sensor (13). In some embodiments, the signal line (17) is connected galvanically to the mass flow sensor (13). In some embodiments, a signal line (17) is connected optically to the mass flow sensor (13).

In some embodiments, the feed duct (11) has a fluid connection to the burner (1). In some embodiments, the feed duct (11) has a direct fluid connection to the burner (1). In some embodiments, the feed duct (11) opens out into the burner (1). In some embodiments, the feed duct (11) opens out directly into the burner (1).

In some embodiments, the side duct (24) has a fluid connection to the feed duct (11) via a connection point (12). In some embodiments, the connection point (12) comprises the inlet or the outlet. In some embodiments, the connection point (12) is the inlet or the outlet. In some embodiments, the side duct (24) has a fluid connection to the feed duct (11) via one or more openings (26) of the connection point (12). In some embodiments, the side duct (24) has a direct fluid connection to the feed duct (11) via the connection point (12). In some embodiments, the side duct (24) has a direct fluid connection to the feed duct (11) via one or more openings (26) of the connection point (12).

In some embodiments, the first portion of the side duct (24) comprises the connection point (12); and the first portion of the side duct (24) has a fluid connection to the feed duct (11) via the connection point (12). In some embodiments, the first portion of the side duct (24) has a fluid connection to the feed duct (11) via one or more openings (26) of the connection point (12). In some embodiments, the first portion of the side duct (24) has a direct fluid connection to the feed duct (11) via the connection point (12). In some embodiments, the first portion of the side duct (24) has a direct fluid connection to the feed duct (11) via one or more openings (26) of the connection point (12).

In some embodiments, the feed duct (11) and side duct (24) are arranged in a volume with homogeneous temperature distribution. In some embodiments, a distance between the inlet (23) of the feed duct, the flap (4) or the air flap (4) of the feed duct (11) and the side duct (24) is as small as possible. This facilitates an arrangement of the inlet (23) of the feed duct, of the flap (4) or air flap (4) of the feed duct (11) and of the side duct (24) in a volume with homogeneous temperature distribution. The danger of condensation on the mass flow sensor (13) is reduced thereby, because it is unlikely that the fluid reaches its dew point on its way through the side duct (24).

In some embodiments, the feed duct (11) has an inlet (23); and a shortest distance between the inlet (23) of the feed duct (11) and the side duct (24) amounts to less than one thousand millimeters. In some embodiments, a shortest distance between the inlet (23) of the feed duct (11) and the side duct (24) amounts to less than five hundred millimeters. In some embodiments, a shortest distance between the inlet (23) of the feed duct (11) and the side duct (24) amounts to less than two hundred millimeters.

In some embodiments, a distance between the inlet (23) of the feed duct (11) and the side duct (24) is as small as possible. This makes possible an arrangement of the inlet (23) of the feed duct (11) and of the side duct (24) in a volume with homogeneous temperature distribution. The danger of condensation on the mass flow sensor (13) is thereby reduced because it is unlikely that the fluid reaches its dew point on its way through the side duct (24).

In some embodiments, the outlet of the side duct (24) is arranged outside the feed duct (11); and a shortest distance between the inlet (23) of the feed duct (11) and the side duct (24) amounts to less than one thousand millimeters.

The inlet (23) of the feed duct (11) is different from the outlet of the side duct (24). The outlet of the side duct (24) may provide for the exit of the fluid from the side duct (24). In some embodiments, the outlet of the side duct (24) is for the exit of air from the side duct (24).

In some embodiments, the outlet of the side duct (24) is arranged outside the feed duct (11); and a shortest distance between the inlet (23) of the feed duct (11) and the side duct (24) amounts to less than five hundred millimeters. In some embodiments, a shortest distance between the inlet (23) of the feed duct (11) and the side duct (24) amounts to less than two hundred millimeters.

In some embodiments, the outlet of the side duct (24) has a fluid connection to the inlet of the side duct (24).

In some embodiments, the first end of the side duct (24) comprises a connection point (12) in the form of the inlet of the side duct (24) and the second end of the side duct comprises the outlet of the side duct (24).

In some embodiments, the first end of the side duct (24) comprises a connection point (12) in the form of the outlet of the side duct (24) and the second end of the side duct comprises the inlet of the side duct (24).

In some embodiments, the connection point (12) comprises the inlet of the side duct (24) and the feed duct (11) comprises a flap (4); the side duct (24) has a fluid connection to the feed duct (11) via the connection point (12); the side duct (24) has a fluid connection to the feed duct (11) via the outlet of the side duct (24); and the flap (4) in the feed duct (11) is arranged between the inlet and the outlet of the side duct (24).

In some embodiments, the side duct (24) has a fluid connection to the feed duct (11) via one or more openings (26) of the connection point (12); and the flap (4) in the feed duct (11) is arranged between the inlet and the outlet of the side duct (24).

The present disclosure moreover teaches one of the aforementioned combustion apparatuses, the feed duct (11) comprises an air flap (4); and the air flap (4) is arranged in the feed duct (11) between the inlet and the outlet of the side duct (24).

In some embodiments, the side duct (24) has a fluid connection to the feed duct (11) via one or more openings (26) of the connection point (12); and the air flap (4) is arranged in the feed duct (11) between the inlet and the outlet of the side duct (24).

In some embodiments, the side duct (24) has a fluid connection to the feed duct (11) via the inlet of the side duct (24); and the side duct (24) has a fluid connection to the feed duct (11) via the outlet of the side duct (24).

In some embodiments, the side duct (24) has a fluid connection to the feed duct (11) via one or more openings of the outlet of the side duct (24).

In some embodiments, the mass flow sensor (13) and/or the flow restriction element (14) are arranged outside the feed duct (11); the feed duct (11) and mass flow sensor (13) and/or the flow restriction element (14) are arranged in this case in a volume with an essentially homogeneous temperature distribution. Ideally feed duct (11) and mass flow sensor (13) and/or the flow restriction element (14) are arranged in this case in a volume with homogeneous temperature distribution.

In some embodiments, the feed duct (11) and mass flow sensor (13) and/or the flow restriction element (14) are arranged in this case in a volume with an essentially homogeneous temperature distribution. In some embodiments, feed duct (11) and mass flow sensor (13) and/or the flow restriction element (14) are arranged in this case in a volume with homogeneous temperature distribution.

In some embodiments, the outlet of the side duct (24) is able to be connected or is connected to the feed duct (11), and the side duct (24) has a direct fluid connection to the feed duct (11) via the outlet of the side duct (24).

In some embodiments, the outlet of the side duct (24) is able to be connected or is connected to the feed duct (11), the side duct (24) has a direct fluid connection to the feed duct (11) via one or more openings of an inlet of the side duct (24); and the side duct (24) has a direct fluid connection to the feed duct (11) via one or more openings of an outlet of the side duct (24).

In some embodiments, the outlet of the side duct (24) is able to be connected or is connected to the feed duct (11), the side duct (24) has a direct fluid connection to the feed duct (11) via the inlet of the side duct (24); and the side duct (24) has a direct fluid connection to the feed duct (11) via the outlet of the side duct (24). In some embodiments, feed duct (11) and mass flow sensor (13) and/or the flow restriction element (14) are arranged in this case in a volume with an essentially homogeneous temperature distribution. In some embodiments, feed duct (11) and mass flow sensor (13) and/or the flow restriction element (14) are arranged in this case in a volume with homogeneous temperature distribution. In some embodiments, the outlet of the side duct (24) is configured to let the fluid flow out directly from the side duct (24) into the feed duct (11).

The present disclosure moreover teaches one of the aforementioned combustion apparatuses, in which the outlet of the side duct (24) has a fluid connection to the feed duct (11), wherein one or more openings of the inlet of the side duct (24) are embodied to let the fluid from the feed duct (11) flow directly into the side duct (24).

In some embodiments, the combustion apparatus has a heat proofing layer; wherein the side duct (24) has a fifth portion arranged outside the feed duct (11); the mass flow sensor (13) is arranged in the fifth portion; and the heat proofing layer is arranged on the outside of the fifth portion of the side duct (24).

In some embodiments, the fifth portion of the side duct (24) comprises the second portion of the side duct (24). In some embodiments, the fifth portion of the side duct (24) is the second portion of the side duct (24). In some embodiments, the fifth portion comprises the second portion of the side duct (24) and parts of the first portion of the side duct (24), for example the mass flow sensor (13) and/or the flow restriction element (14).

In some embodiments, the heat proofing layer comprises at least one the materials:

- polystyrenes,
- calcium silicate sheets,
- mineral wool, e.g. glass wool and/or rock wool,
- mineral foam sheets, and
- porous concrete.

In some embodiments, the heat proofing layer has a thickness of at least two millimeters or of at least five millimeters or of at least ten millimeters. In some embodiments, the heat proofing layer, in a radial direction starting from the fifth portion of the side duct (24), has a thickness of at least two millimeters or of at least five millimeters or of at least ten millimeters.

A heat proofing layer on the outside of the side duct (24) limits a cooling of surfaces of the side duct (24) to temperatures below the dew point of the fluid contained in the water vapor. In some embodiments, the heat proofing layer on the outside of the side duct (24) limits a cooling of surfaces of the side duct (24) to temperatures below the dew point of the inlet air contained in the water vapor. Condensation on the mass flow sensor (13) is thus avoided.

Various changes to the examples described can be made without departing from the underlying idea and without departing from the framework of this disclosure. The subject matter of the present disclosure is defined by its claims. Very wide-ranging changes can be made without departing from the scope of protection of the following claims.

REFERENCE CHARACTERS

1 Burner
2 Heat consumer
3 Fan

4 Air flap
5 Air feed
6 Fuel feed
7, 8 Safety shut off valves
9 Fuel flap
10 Exhaust flow
11 Feed duct
12 Connection point
13 Mass flow sensor
14 Flow restriction element
15 Flow amount
16 Regulation and/or control and/or supervision facility
17-22 Signal lines
23 Air intake
24 Side duct
25 Exhaust path
26 Openings of the connection point
27 Homogeneous air volume

The invention claimed is:

1. A combustion apparatus comprising:
a burner;
a side duct; and
a feed duct;
wherein the side duct comprises an inlet, an outlet, and a mass flow sensor between the inlet and the outlet of the side duct;
wherein the mass flow sensor is configured to detect a signal corresponding to an amount of flow of a fluid through the side duct;
wherein the side duct comprises a first portion and a second portion;
wherein the first portion of the side duct comprises the mass flow sensor; and
wherein the first portion of the side duct is arranged within the feed duct and the second portion of the side duct is arranged outside of the feed duct.

2. The combustion apparatus as claimed in claim 1, wherein:
the first portion of the side duct comprises a flow restriction element; and
the flow restriction element further subdivides the first portion into a third portion facing toward the mass flow sensor and a fourth portion facing away from the mass flow sensor and has a passage surface for a passage of the fluid between the third portion of the side duct and the fourth portion of the side duct.

3. The combustion apparatus in accordance with claim 1, wherein the first portion of the side duct projects at least ten millimeters into the feed duct.

4. The combustion apparatus in accordance with claim 1, wherein:
the feed duct has an inner side and an inner wall;
the inner wall of the feed duct is arranged on the inner side of the feed duct and the inner wall of the feed duct surrounds the inner side of the feed duct; and
a shortest distance between the inner wall of the feed duct and the mass flow sensor measures at least one millimeter.

5. The combustion apparatus as claimed in claim 1, wherein:
the feed duct has an inner side and an inner wall;
the inner wall of the feed duct is arranged on the inner side of the feed duct and the inner wall of the feed duct surrounds the inner side of the feed duct; and
a shortest distance between the inner wall of the feed duct and the at least one flow restriction element amounts to at least one millimeter.

6. The combustion apparatus as claimed in claim 4, wherein:
a shortest distance between the inner wall of the feed duct and the mass flow sensor measures at least one millimeter; and
a shortest distance between the inner wall of the feed duct and the at least one flow restriction element measures at least five millimeters.

7. The combustion apparatus in accordance with claim 1, wherein the mass flow sensor is flush with the inner wall of the side duct or projects into the side duct.

8. The combustion apparatus in accordance with claim 1, further comprising a signal line connected to the mass flow sensor;
wherein the signal line has a first portion embedded in a wall of the side duct.

9. The combustion apparatus in accordance with claim 1, wherein the feed duct has a fluid connection to the burner.

10. The combustion apparatus in accordance with claim 1, wherein the side duct has a fluid connection to the feed duct via a connection point.

11. The combustion apparatus in accordance with claim 1, wherein the feed duct has an inlet; and a shortest distance between the inlet of the feed duct and the side duct measures less than one thousand millimeters.

12. The combustion apparatus in accordance with claim 1, wherein the outlet of the side duct has a fluid connection to the inlet of the side duct.

13. The combustion apparatus in accordance with claim 10, wherein:
the connection point comprises the inlet of the side duct and the feed duct comprises a flap;
the side duct has a fluid connection to the feed duct via the connection point;
the side duct has a fluid connection to the feed duct via the outlet of the side duct; and
wherein the flap in the feed duct is arranged between the inlet and the outlet of the side duct.

14. The combustion apparatus in accordance with claim 1, wherein:
the side duct comprises a first and a second end;
the second end of the side duct is different from first end of the side duct and the second end of the side duct lies opposite the first end of the side duct; and
the first end of the side duct comprises a connection point in the form of the inlet of the side duct and the second end of the side duct comprises the outlet of the side duct.

15. The combustion apparatus in accordance with claim 1, wherein:
the side duct comprises a first and a second end;
the second end of the side duct is different from first end of the side duct and the second end of the side duct lies opposite the first end of the side duct; and
the first end of the side duct comprises a connection point in the form of the outlet of the side duct and the second end of the side duct comprises the inlet of the side duct.

* * * * *